United States Patent [19]

Brasse et al.

[11] Patent Number: 4,854,918

[45] Date of Patent: Aug. 8, 1989

[54] SPEED CHANGER PULLEY

[75] Inventors: Jean-Jacques Brasse, Montigny-Les-Cormeilles; Ciriaco Bonfilio, Clichy, both of France

[73] Assignee: Valeo, Paris, France

[21] Appl. No.: 222,778

[22] Filed: Jul. 22, 1988

[30] Foreign Application Priority Data

Jul. 23, 1987 [FR] France ................. 87 10467

[51] Int. Cl.⁴ ............................................. F16H 55/14
[52] U.S. Cl. .......................................... 474/11; 474/94
[58] Field of Search .............................. 474/8, 11–14, 474/17, 28, 69, 70, 94

[56] References Cited

U.S. PATENT DOCUMENTS 4,573,948  3/1986  deBriel ................................ 474/28
4,608,030  8/1986  deBriel ................................ 474/13

FOREIGN PATENT DOCUMENTS 0050920  5/1982  European Pat. Off. .
2516622  11/1981  France .
2557661  7/1985  France .
2109490  6/1983  United Kingdom .
2140106  11/1984  United Kingdom .

Primary Examiner—Thuy M. Bui
Attorney, Agent, or Firm—Charles E. Brown; Charles A. Brown

[57] ABSTRACT

A pulley of a speed changer comprises two annular flanges one of which is movable axially on a hub under the control of elastic return means constituted by at least one diaphragm encased with a covering of resilient material. A bridging element made of resilient material is interposed between the diaphragm and a bearing piece fixed to the hub. Towards its extremity adjacent to the bearing piece, the bridging element is fitted into a housing made in the bearing piece.

4 Claims, 2 Drawing Sheets

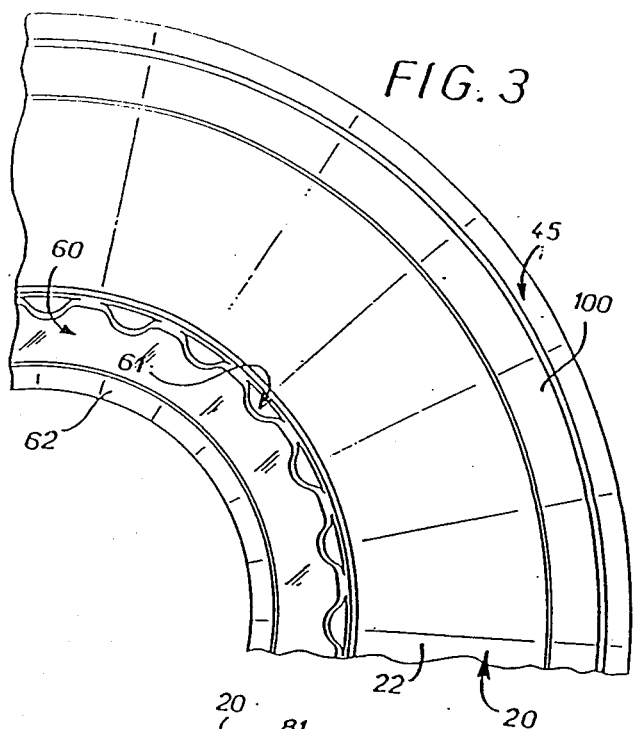
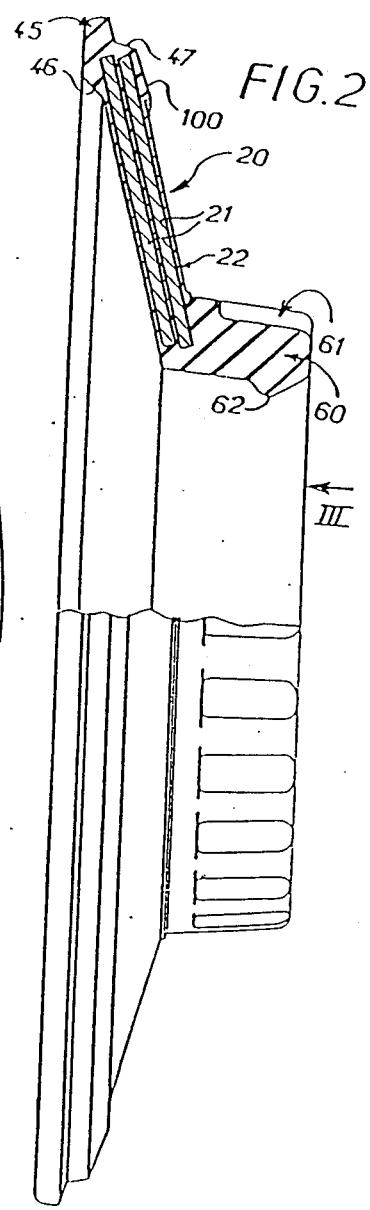
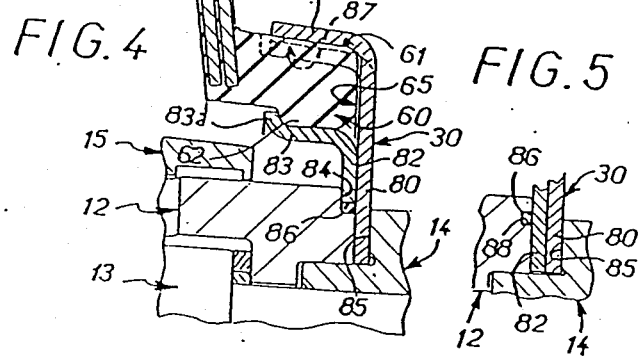
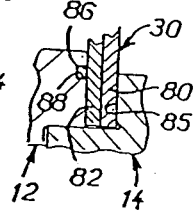
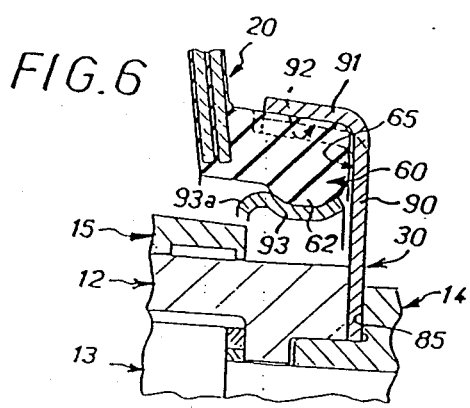

SPEED CHANGER PULLEY

BACKGROUND OF THE INVENTION

The present invention relates generally to speed changers of the kind comprising two pulleys, driving and driven respectively, each of which comprises a hub and two annular flanges facing each other around the said hub to receive a belt, one of the flanges being axially movable relative to the hub and being subjected to the action of annular elastic means which urge it continuously towards the other flange, which is fixed, these elastic means bearing against the movable flange and a bearing piece fixed to the hub.

For controlling the configuration of the assembly and thus the transmission ratio, the movable flange of at least one of the pulleys is subject to the action of elastic return means which urge it continuously towards the fixed flange, and which comprise an annular piece with a variably conical shape known as a diaphragm, which through a peripheral part forming a Belleville washer, bears axially indirectly on the movable flange and which, through a central part divided into radial fingers, bears indirectly on the axially fixed bearing piece of the hub.

A speed changer of this kind is described in U.S. Pat. No. 4559026.

In this document, between the diaphragm 21 and the bearing piece fixed to the hub, to constitute a rocking axial bearing, a bridging element made of resilient material is fixed both axially and circumferentially, on the one hand to the inner peripheral part of the diaphragm and, on the other hand, to the bearing piece. For this purpose the bridging element is glued or fastened to the diaphragm and to the bearing piece.

A bridging element interposed in this way between the diaphragm and the movable flange, and its method of assembly, present disadvantages.

Amoung these disadvantages must be mentioned the operations of fastening or glueing, which are lengthy and delicate, and consequently have a relatively high cost.

The invention aims to reduce these disadvantages whilst ensuring a reliable connection between the diaphragm and the movable flange to ensure a good transmission of torque.

SUMMARY

The invention proposes a pulley of a speed changer of the kind comprising a hub and, disposed opposite each other around the said hub, two annular flanges one of which is mounted to be axially movable relative to the hub under the control of elastic return means constituted by at least one annular element such as a diaphragm presenting, on the one hand, a peripheral part forming a Belleville washer which bears axially for rocking against the movable flange and, on the other hand, a central part divided by gaps into radial fingers, which rocks axially against a bearing piece, fixed to the hub, by a bridging element made of resilient material interposed axially between the diaphragm and the bearing piece, characterised in that the bridging element towards its end adjacent to the bearing piece, is fitted into a housing made in the bearing piece.

According to one embodiment of the invention, a covering of resilient material encases the diaphragm, this covering being prolonged axially at the inner periphery of the diaphragm to form the said bridging element.

According to another variant of the invention, the aforementioned housing made in the bearing piece is formed by the internal space delimited on the surface of the bearing piece adjacent to the diaphragm between an axial ring, coaxial with the hub, and a series of axially projecting lugs on the bearing piece, or between two coaxial rings.

According to another embodiment of the invention, the aforementioned ring and the peripheral outer surface of the bridging element have an undulating profile forming axially orientated undulations, nested within each other to fix the bridging element in rotation with the bearing piece.

According to another variant of the invention, the bearing piece is constituted by the flange of a torsion damper.

As a consequence of these different arrangements, the invention has the advantage of ensuring perfect sealing in the case of a speed changer controlled by a fluid source, without having recourse to complementary elements. In addition, it should be noted that the sealing ensured by the bridging element itself is automatically reinforced in the case in which fluid under pressure is used.

BRIEF DESCRIPTION OF THE DRAWINGS

FIG. 2 is a view in partial section of the elastic returning means which act on the movable flange of the pulley;

FIG. 3 is a view in the direction of the arrow III in FIG. 2;

FIG. 4 is a view in partial axial section of an alternative embodiment of the invention;

FIG. 5 is a view in partial axial section of a variant of the embodiment in FIG. 4; and FIG. 6 is a view in partial axial section of an alternative embodiment of the invention.

DESCRIPTION OF THE PREFERRED EMBODIMENTS

Figure 1:
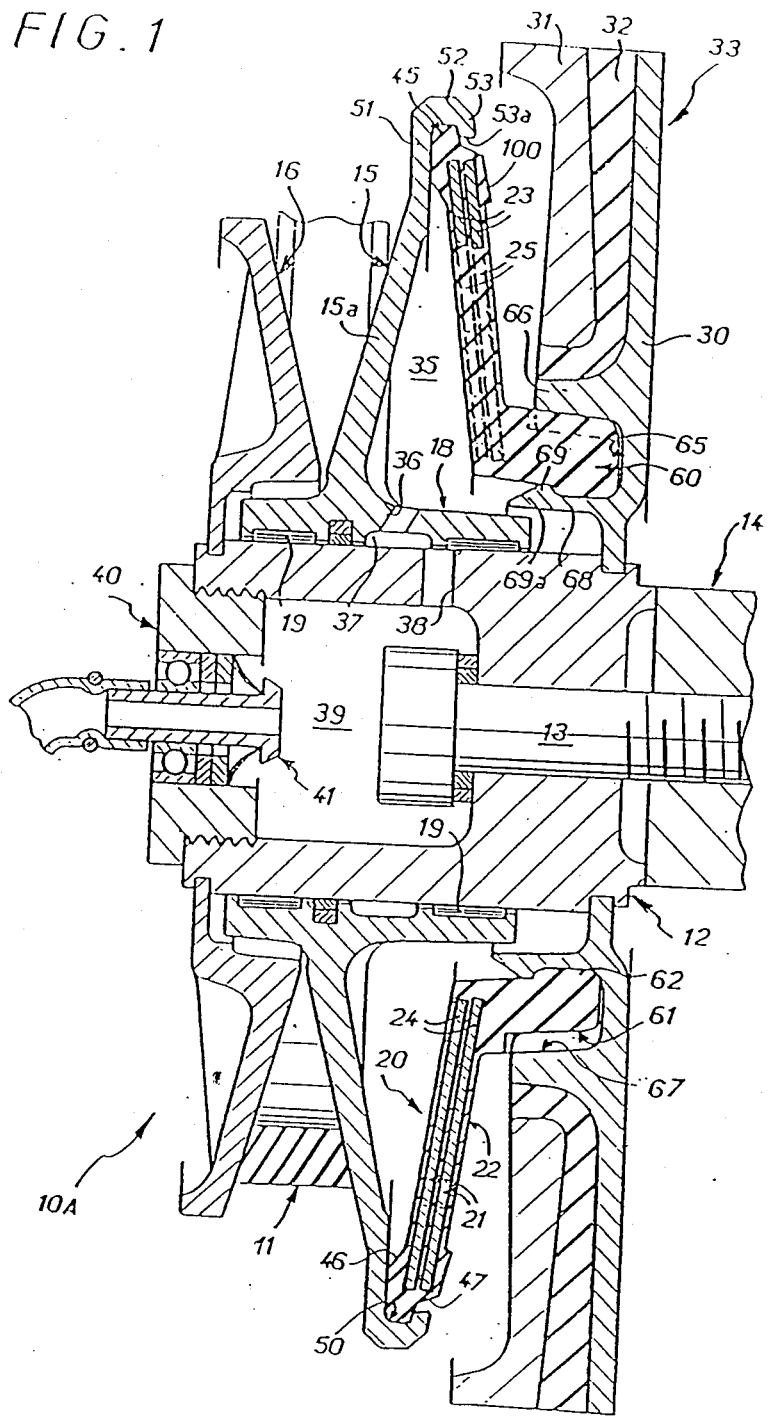
FIG. 1 is a view in axial section of a speed changer pulley according to the invention.

In FIG. 1 a pulley of a speed changer similar to the kind described in the Patent mentioned previously is shown. In practice this pulley 10A is the driving pulley.

The driving pulley 10A comprises a hub 12 which is connected by a screw 13 at the end of a driving shaft 14 and is thus fixed in rotation with the latter. Around the hub 12 are mounted two annular flanges 15 and 16 with frustoconical flanks facing one another to receive a belt 11, and at least one of which (in practice flange 15) is mounted to be axially movable relative to hub 12. The flange 16, or fixed flange, is permanently fastened both axially and circumferentially to hub 12, for example by crimping.

In order to move axially on hub 12, the movable flange 15 terminates at its inner periphery in an axial connecting piece 18 which extends on both sides of flange 15. This connecting piece 18 is slidingly engaged on hub 12 with the interposition of sliding races 19.

Flange 15 is continuously urged towards flange 16 by axially acting elastic return means 20.

In this embodiment these means 20 are constituted by two generally annular pieces 21, disposed parallel to one another and separated from one another. These two pieces 21 consist of two diaphragms covered by a resilient material 22, such as a elastomer. This covering 22 is permanently fixed to the diaphragms 21 by glueing or by adhesion resulting from vulcanization.

Each diaphragm 21 comprises a circularly continuous peripheral part 23 forming a Belleville washer and a central part 24 divided into radial fingers by gaps 25.

These diaphragms 21 and the covering 22 constitute a unitary resilient assembly with a variably conical shape which, through the pheripheral parts 23 bears axially to rock against the movable flange 15 and which through the central parts 24 bears axially to rock against a bearing piece 30.

This piece 30 is constituted, in the example shown, by a flange fixed axially in rotation with hub 12, being for example crimped for this purpose by its inner periphery on the end of the hub furthest from flange 16. This flange 30 carries an annular mass 31 forming an inertia ring, with a damping element 32 made of resilient material confined between flange 30 and ring 31. This element 32 is for example glued or fastened to ring 31 and flange 30, the assembly thus formed constituting a damper 33 to filter out the vibrations which arise along the kinematic chain in which the speed changer is interposed.

A control chamber 35 is defined between flange 15, hub 12 and the assembly constituted by the elastic means 20 and the bearing piece 30. This chamber 35 is connected to a source of fluid (not shown) and in particular to a source of pneumatic fluid under pressure or at reduced pressure. For this purpose at least one radial orifice 36 is machined in the connector 18 opening into an annular groove 37, with a rectangular shape in the axial direction, provided on the inner periphery of connector 18. This groove 37 is in permanent communication, through a radial channel 38 machined in hub 12, with an internal hollow space 39 in hub 12. This hollow space 39, in the end of hub 12 furthest away from the drive shaft 14, is closed so that it is sealed by a plug 40 equipped with a connector 41 which connects the hollow space 39 with the source of fluid.

The covering 22 of resilient material is prolonged radially outwards beyond the circular parts 23 to form a rim 45. This radial rim 45 is axially off-set relative to the diaphragms and connects with the covering 22 through two annular sloping faces, the inner face 46 and outer face 47 respectively. The axial off-set of the rim separates the diaphragms 21 from the flange 15 which enables them to be freely deformed during movements of the flange.

The rim 45 is fitted into a housing 50 made in the movable flange 15 so as to constitute a rocking bearing for the diaphragms 21 and to fix them at least axially to the movable flange 15.

The flange 15 has a central sloping part 15a prolonged outwards by an annular radial part 51 which terminates in two successive folds substantially at 90°, to form respectively an axial flange 52 and a radial flange 53 directed inwards. The inner peripheral surfaces of these two flanges 52, 53 delimit the housing 50. It should be noted that the outer face 47 between the rim 45 and the diaphragms 21 allows the rim 45 to disengage from the adjacent end 53a of the radial flange 53 allowing a tool to be passed in to fit the rim 45 in, as will be described later.

The covering 22 is prolonged at its inner periphery by an annular, axially extending bridging element 60 which extends towards the bearing piece 30. Towards its terminal part, adjacent to piece 30, bridging element 60 presents an undulating profile forming undulations 61 with an axial orientation on its outer periphery and an annular boss 62 on its inner periphery. The bridging element 60 is fitted in a housing 65 made in the adjacent face of the bearing piece 30. For this purpose flange 30 comprises an axial ring 66, coaxial with hub 12, with undulations 67 having a shape complementary to that of undulations 61 and obtained by stamping, for example. A series of lugs 68 projecting axially from flange 30 are regularly distributed on a circumference coaxially inside ring 66.

Each lug 68 comprises, on the same side as the housing 65, and towards its terminal extremity, a boss 69 which connects with the end of lug 68 through a sloping face 69a. The housing 65 is thus defined by the annular space delimited between ring 66 and the lugs 68.

It should be noted that sufficient space is provided between the lugs 68 and hub 12 to enable free passage of the connecting piece 18 of the movable flange 15 during its displacement towards its position of maximum separation relative to the fixed flange 16.

Assembly of the pulley 10A is effected as follows.

The flange 16 is connected and fixed, by crimping for example, on the hub 12, a the end of the latter and on the side away from the drive shaft 14. The movable flange 15 is mounted, so that it can slide, around the hub 12 on sliding races 19. The unitary resilient assembly 20 is connected around the hub 12 and, with the aid of a tool (not shown) which bears on the end 53a, the rim 45 is deformed to be completely fitted in the housing 50. Then the damper 33 is connected around the hub 12 with the forced fitting in of the bridging element 60 in the housing 65. As a result of the resilience of the lugs 68 and of the bridging element 60 this ca be fitted into the interior of the housing 65 with nesting of its undulations 61 in the axial undulations 67 of ring 66 and bearing of its internal boss 62 on the bosses 69 of the lugs 68. It should be noted that once the bridging element 60 is in abutment against the flange 30 at the bottom of the housing 65, the deformation of the bridging element 60 entrains a compression of its internal boss 62, which comes into contact with the lugs 68 along th entire length of these. Through the nesting of the undulations 61, 67 the bridging element 60 is fixed in rotation to the flange 30. Finally, the flange 30 is fixed to the hub 12, by crimping for example.

Referring to FIG. 4, the bearing piece 30 is constituted, on the one hand, by a first annular washer 80 the outer periphery of which is bent down, substantially at 90°, to form a flange 81, and, on the other hand, by a second annular washer 82, smaller in size, the outer periphery of which is likewise bent down, substantially at 90°, to form a flange 83. The two washers 80, 82 are coupled to one another, connected coaxially to the hub 12 and the shaft 14, and mounted between the two adjacent extremities of the hub and the shaft, in such a way that the two flanges 81 and 83 extend axially towards the elastic means 20, delimiting between them the housing 65 in which the bridging element 60 is fitted. The washer 82 comes to bear, towards its inner periphery, against a shoulder 84 provided at the extremity of hub 12, whilst the washer 80 bears, through one face, against the extremity of the hub 12 and, by the other face, against a shoulder 85 provided towards the extremity of shaft 14. The two washers 80, 82 are fixed by squeezing between the hub 12 and the shaft 14 by the action of the screw 13. An annular sealing joint 86 is provided on the inner extremity of washer 82. The outer axial flange 81 of the housing 65 presents axial undulations 87, obtained by stamping for example, which nest in the axial undulations 61 provided on the outer periphery of the bridging element 60, to ensure the fastening in rotation of the bridging element 60 to the bearing washers 80, 82. Finally, the free extremity of the axial flange 83 of the washer 82 is bent slightly outwards to form a flange 83a which retains the bridging element 60 axially in its housing 65.

Referring to FIG. 5, the washer 82 comes to bear against the outer surface of the hub 12 and the washer 80 comes to bear against the shoulder 85 provided towards the extremity of the shaft 14. The sealing joint 86 is installed in a groove 88 provided on the end surface of the hub 12.

Referring to FIG. 6, the bearing piece 30 is formed, on the one hand, by a washer 90, the outer extremity of which is bent down inwards to form an axial flange 91 and, on the other hand, by a ring 93 coaxial with the hub 12 and the shaft 14. The flange 91 has axial undulations 92, obtained by stamping for example, and the ring 93 is mounted freely between the hub 12 and the axial flange 91 of the washer 90, without being fixed to the washer. During assembly, the ring 93 is automatically centred by the inner periphery of the bridging element 60 and then the washer 90, installed between the adjacent end surfaces of the hub 12 and the shaft 14, is held in position by the screw 13 which couples the hub and the shaft. The ring 93 comprises, towards its extremity adjacent to the bridging element 60, a flange 93a to retain the cross-piece axially once the latter is fitted in the housing 65.

This latter embodiment is particularly advantageous in the case of a centrifugal speed changer where it is not necessary to ensure a seal.

Of course, the rim 45 in the axial direction and the bridging element 60 in the radial direction must present transverse cross-sections of greater dimensions than those of the respective housings 50, 65 to be capable of being fitted during assembly. Finally, it should be noted that the elastic return means 20 are fixed to the movable flange 15 and the bearing piece 30, exercising a pressure which permits retention of the rim 45 and the bridging element 60 fitted in to their respective housings 50, 65. This pressure is exercised especially after the fixing of the flange 30 on the hub 12.

In a general way, to limit the separation between the flanges 15, 16 of the driving pulley 10A and to prevent the belt 11 coming out of the pulley, a stop 100 is provided between the movable flange 15 and the bearing piece 30 to limit the extent of movement.

This stop 100 is advantageously fixed to the elastic return means 20 and is formed by an annular boss of resilient material extending annularly towards the bearing piece 30. In this example, the boss 100 is constituted by the covering 22 at the level of the circular part 23 of the diaphragms 21, and comes to bear against the adjacent wall of the inertia ring 31 of the damper 33.

Alternatively, if the speed changer is not associated with a damper 33, it is sufficient that the bearing piece 30 extends radially to a length sufficient to cooperate with the stop 100.

In the embodiment described in FIG. 1, the lugs 68 may be replaced by a continuous ring comprising a boss to retain the bridging element 60 axially, once this is introduced into the housing 65.

In the embodiments of FIGS. 4 to 6, the washers 80, 90 may be fixed to the hub 12 by crimping instead of being squeezed between the hub 12 and the shaft 14.

The invention is not limited in application to the embodiments described above, and applies equally well to a driving pulley as to a driven pulley of a speed changer, of the controlled kind or of the centrifugal kind.

What is claimed is:

1. A speed changer pulley of the kind comprising a hub and two annular flanges disposed opposite each other around said hub, one of said flanges being axially movable relative to the said hub under the control of elastic return means constituted by at least one annular element comprising a diaphragm presenting, on the one hand, a peripheral part forming a Belleville washer which bears axially to rock against the movable flange and, on the other hand, a central part divided by gaps into radial fingers, which bears for rocking movement against a bearing piece, fixed to the hub, by means of a bridging element made of resilient material interposed axially between the diaphragm and the bearing piece, wherein said bridging element towards its extremity adjacent the bearing piece, is disposed in a housing in said bearing piece, a covering of resilient material encasing the diaphragm, said covering being prolonged axially towards the inner periphery of the diaphragm to form said bridging element, said housing being formed by the interior space delimited on the surface of the bearing piece adjacent to the diaphragm between two rings coaxial with the hub.

2. A pulley according to claim 1, wherein said housing is formed by the interior space delimited on the surface of the bearing piece adjacent to the diaphragm between an axial ring coaxial with the hub and axial lugs disposed around a circle coaxial with the said ring.

3. A pulley according to claim 1, wherein said housing is formed between two axial flanges of two radial washers coupled and fixed to the hub.

4. A pulley according to claim 1, wherein said housing is formed between an axial flange of a radial washer fixed to the hub and a ring freely connected around said hub and automatically centred by the inner peripheral surface of the bridging element.

* * * * *